April 28, 1925.                                                   1,535,991
                         J. M. CROM
                  CEMENT PLACING MACHINERY
                     Filed June 29, 1923
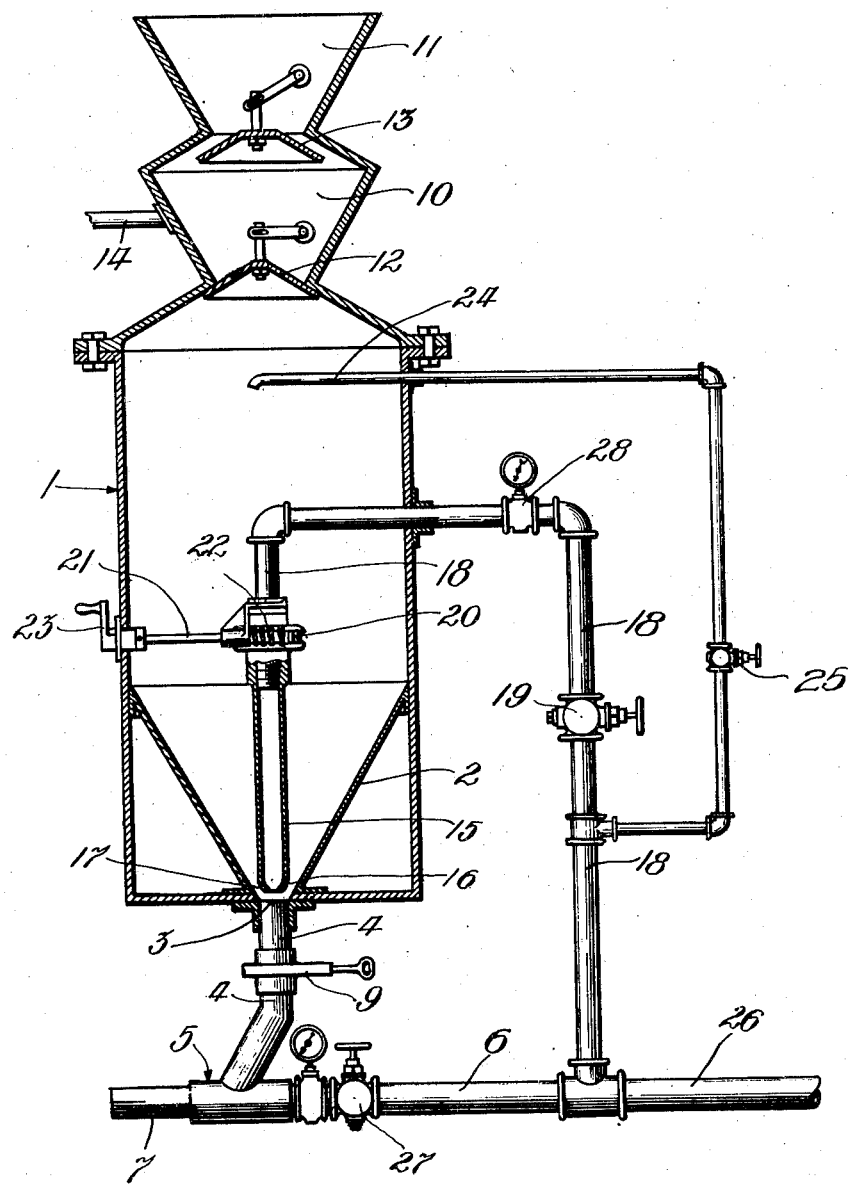
Inventor:
John M. Crom.
by [signature] Att'ys Patented Apr. 28, 1925.

1,535,991

UNITED STATES PATENT OFFICE.

JOHN M. CROM, OF WILMETTE, ILLINOIS.

CEMENT-PLACING MACHINERY.

Application filed June 29, 1923. Serial No. 648,524.

*To all whom it may concern:*

Be it known that I, JOHN M. CROM, a citizen of the United States, residing at Wilmette, in the county of Cook and State of Illinois, have invented certain new and useful Improvements in Cement-Placing Machinery, of which the following is a specification.

This invention has to do with certain improvements in cement placing machinery or like machines. These machines are used for spraying or shooting cement and other similar materials, generally by the action of compressed air. One of the objects of the present invention is to provide an arrangement for ensuring a proper and satisfactory delivery of the solid materials to the conduit leading to the nozzle, without the necessity of using a special unit measuring device such as a rotating notched wheel.

In connection with the foregoing, a further object of the invention is to make provision for ensuring a proper and uniform delivery of the materials into the conduit notwithstanding the fact that no rotating notched wheel is provided. In this connection, it is a further object to bring about the delivery of the materials into the conduit entirely by the use of compressed air which is available for the operation of the nozzle itself.

A further object of the invention is to provide an arrangement such that the body of the material contained in bulk within the hopper may be agitated either continuously or from time to time as desired, so that the tendency for the materials to "bridge" or "hang up" within the hopper will be eliminated, and a proper continuous delivery to the conduit will be insured.

Another object of the invention is to make provision for easy regulation of the position of the air jet within the hopper, so that the same can be adjusted during the operation of the machine and without interfering with such operation.

A further object of the invention is to make provision for easily bringing the feeding mechanism into service, so that when the operation is first started, the supply of cement material may be easily started and maintained with the desired uniformity and control.

Other objects and uses of the invention will appear from a detailed description of the same, which consists in the features of construction and combinations of parts hereinafter described and claimed.

The single figure of the drawing illustrates more or less diagrammatically a hopper for the cement materials, together with the associated pipes and valves for giving the proper control both in starting and during operation.

The hopper in its entirety is designated by the numeral 1. It is preferably air tight and of sufficient strength to withstand the operating air pressure, say fifty to one hundred pounds per square inch. Also the lower portion of the hopper is preferably provided with a tapered floor 2, so that the materials will naturally gravitate towards the lower discharge point 3. These materials are delivered into a pipe 4 leading down to a connection 5 through which compressed air may be delivered from the pipe 6 and discharged through the connection 7. The connection 5 may be so formed as to produce a certain amount of suction action. The compressed air flowing through the pipe 6 and past the connection 5 will tend to carry the dry cement materials from the pipe 4 and discharge them through the connection 7 and through the proper conduit to the nozzle, which is not illustrated in the drawing. A gate valve 9 is illustrated in the pipe 4, so that when closed the delivery of materials and discharge of air from the hopper can be entirely cut off, whereas by proper manipulation of this gate valve, the flow of the raw materials can be regulated.

The upper portion of the hopper 1 is provided with an air lock 10, and above this is placed the receiving hopper 11. The lock valves 12 and 13 are placed between the air lock 10 and the hopper 1 and the receiving hopper 11 respectively. By first closing the lock valve 13 and then introducing compressed air through the pipe 14 into the air lock, the pressures within the hopper 1 and the air lock can be equalized, so that the valve 12 will fall and allow the materials to be discharged into the hopper 1. Upon closing the valve 12 and lowering the air pressure within the air lock, the valve 13 can be opened and an additional charge of material from the receiving hopper 11 can then be delivered into the air lock for the next operation.

A jet pipe 15 is placed in a vertical position in the central portion of the hopper 1. The lower end 16 of this jet pipe 15 is located close to the discharge opening 3 of the hopper 1, so that the air jet will deliver more or less directly into the opening 3, carrying with it raw materials which will find their way through the annular passage 17 around the jet. These raw materials will work down along the slanting floor 2 of the hopper according to the demand.

The jet pipe 15 is preferably threaded onto an air pipe 18 which reaches into the hopper 1 and is provided with a control valve 19 easily accessible to the operator.

The jet pipe 15 is also provided with a worm gear 20. A shaft 21 reaches into the hopper 1 and carries a worm 22 at its inner end meshing with the worm gear 20. A crank 23 is illustrated as a convenient means for turning the shaft 21. Upon turning this crank the jet pipe 15 will be rotated in the one direction or the other, so that it can be either raised or lowered in order to adjust the position of the discharge end 16 of the jet pipe with respect to the opening 3. In this way the operation of the jet can be readily controlled without interfering with the continuous operation of the machine.

The air pressure coming from the jet will be expended chiefly in the generation of a high velocity of air discharged from the jet itself; but there will be some reaction back up into the body of the hopper 1, and this will be exerted up through the body of the material contained in the hopper and will tend to agitate and loosen up the same, so that the feeding process will continue in regular manner. If it should be desired to exert a pressure upon the top of the material in the hopper, this can be done by the use of a supplemental pipe 24 reaching into the hopper and terminating above the normal level of the material therein and under control of a valve 25.

The compressed air is delivered to the machine from the pipe 26, both for the operation of the jet and for the operation of the connection 5. A valve 27 is placed in the pipe 6 to control the flow of air through the connection 5.

Before starting the operation of the machine the valves 19 and 27 will be closed. The valve 27 will first be opened so as to establish a flow of air through the connection 5 ready to discharge the materials coming from the pipe 4. The gate valve 8 will then be opened an amount depending upon the desired flow of material. The feed of material will then begin from the hopper, and immediately thereafter the valve 19 may be opened so as to start operation of the jet 15. This will ensure the continuous and even delivery of material from the hopper into the pipe 4. From time to time, as desired, air pressure may be introduced above the level of the material by opening the valve 25, by either leaving it open or opening it intermittently.

An air gauge 28 may be provided for showing the pressure existing in the pipe 18 and delivered to the jet 15, and an air gauge 29 may be provided for showing the pressure of air delivered to the connection 5.

I wish to call particular attention to the fact that I have provided an arrangement in which the air delivered through the jet 15 is entirely discontinued or isolated from the interior of the hopper throughout the entire length of the pipe 18 and until discharged from the lower end 16 of the jet. In this way, the operation of the air jet itself is entirely independent of the pressure existing within the hopper, although as a matter of fact I have also made provision for subjecting the interior of the hopper to air pressure, if desired.

While I have herein shown and described only a single embodiment of the features of my present invention, still I do not limit myself to the same, except as I may do so in the claim.

I claim:

In a device of the class described, the combination of a relatively air tight hopper having at its upper end means for introducing raw cement materials without escape of air under pressure from said hopper, and having at its lower end a centrally sloping floor, a discharge passage leading from the lowermost portion of said floor, a connection in conjunction with said discharge passage, a delivery connection from said connection, a compressed air connection to said connection, a valve in the connection between the hopper and said connection, a vertical jet pipe within the hopper having its discharge orifice in alignment with the delivery opening of the hopper, means for delivering compressed air directly to said jet pipe under control of the operator, and independently of the interior of the hopper, means exterior to the hopper for raising and lowering the jet pipe within the hopper and with respect to the delivery opening while maintaining the air connection aforesaid, another connection for the delivery of compressed air directly into the upper portion of the interior of the hopper, and suitable valves for controlling the delivery of compressed air to said connection and to the jet pipe independently of each other, whereby the operation of the device may be commenced by the use of said connection, and whereby the subsequent operation may be controlled by the use of the jet device, substantially as described.

JOHN M. CROM.